United States Patent
Ortega et al.

(10) Patent No.: US 10,908,745 B2
(45) Date of Patent: Feb. 2, 2021

(54) THREE DIMENSIONAL TOUCH CONDUCTIVE FABRIC

(71) Applicants: Francisco R. Ortega, Miami, FL (US); Jules Calella, Miami, FL (US); Naphtali Rishe, Miami Beach, FL (US); S. S. Iyengar, Davie, FL (US)

(72) Inventors: Francisco R. Ortega, Miami, FL (US); Jules Calella, Miami, FL (US); Naphtali Rishe, Miami Beach, FL (US); S. S. Iyengar, Davie, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/015,801

(22) Filed: Jun. 22, 2018

(65) Prior Publication Data
US 2019/0391683 A1  Dec. 26, 2019

(51) Int. Cl.
| | | |
|---|---|---|
| *G06F 3/044* | (2006.01) | |
| *G06F 3/01* | (2006.01) | |
| *A41D 1/00* | (2018.01) | |
| *A44C 5/00* | (2006.01) | |
| *A41D 19/00* | (2006.01) | |

(52) U.S. Cl.
CPC .......... *G06F 3/044* (2013.01); *A41D 1/005* (2013.01); *A41D 19/0027* (2013.01); *A44C 5/0053* (2013.01); *G06F 3/011* (2013.01); *G06F 2203/04102* (2013.01); *G06F 2203/04105* (2013.01)

(58) Field of Classification Search
CPC combination set(s) only.
See application file for complete search history.

(56) References Cited

U.S. PATENT DOCUMENTS

| | | | |
|---|---|---|---|
| 9,448,714 B2 | 9/2016 | Duheille | |
| 9,569,003 B2 | 2/2017 | Rofougaran | |
| 2005/0054941 A1* | 3/2005 | Ting | A61B 5/0408 600/529 |
| 2011/0095996 A1* | 4/2011 | Yilmaz | G06F 3/044 345/173 |
| 2012/0081328 A1* | 4/2012 | Kandziora | G06F 3/044 345/174 |
| 2013/0120052 A1* | 5/2013 | Siska | G06F 3/044 327/517 |
| 2013/0154991 A1* | 6/2013 | Yilmaz | G06F 3/044 345/174 |

(Continued)

FOREIGN PATENT DOCUMENTS

WO  2016154560  9/2016

*Primary Examiner* — Patrick N Edouard
*Assistant Examiner* — Peijie Shen
(74) *Attorney, Agent, or Firm* — Saliwanchik, Lloyd & Eisenschenk (57) ABSTRACT

Devices related to a conductive fabric sensor are provided. A device can comprise an insulting and flexible fabric substrate, a central transmitting electrode on a top surface of the insulting and flexible fabric substrate, a plurality of receiving electrodes surrounding the central transmitting electrode and connected to the central transmitting electrode, and a power supply configured to generate a respective electric field between the central transmitting electrode and each receiving electrode of the plurality receiving electrodes.

14 Claims, 4 Drawing Sheets

(56) References Cited

U.S. PATENT DOCUMENTS

| | | | |
|---|---|---|---|
| 2013/0176236 A1* | 7/2013 | Ivanov | G06F 3/04883 345/173 |
| 2013/0207911 A1* | 8/2013 | Barton | G06F 3/0488 345/173 |
| 2014/0092041 A1* | 4/2014 | Ih | G06F 3/044 345/173 |
| 2015/0160754 A1* | 6/2015 | Wenzel | G06F 3/0446 345/174 |
| 2015/0286334 A1* | 10/2015 | Simmons | G06F 3/0416 345/174 |
| 2016/0313852 A1* | 10/2016 | Dorfner | G06F 3/017 |
| 2017/0010707 A1* | 1/2017 | Son | G06F 3/0446 |
| 2017/0075481 A1* | 3/2017 | Chou | G06F 3/044 |
| 2017/0249033 A1* | 8/2017 | Podhajny | G06F 3/044 |
| 2017/0261388 A1* | 9/2017 | Ma | G16H 40/67 |
| 2018/0181202 A1* | 6/2018 | Khoshkava | G06F 3/0447 |
| 2018/0310659 A1* | 11/2018 | Poupyrev | A61B 5/04085 |
| 2019/0024268 A1* | 1/2019 | Hwang | H01L 21/47 |
| 2019/0026519 A1* | 1/2019 | Park | G01L 1/142 |
| 2019/0064962 A1* | 2/2019 | Bye | G06F 3/0446 |
| 2019/0138130 A1* | 5/2019 | Ro | G06F 3/0443 |
| 2019/0234814 A1* | 8/2019 | Yoon | G01L 1/14 |

\* cited by examiner

THREE DIMENSIONAL TOUCH CONDUCTIVE FABRIC

BACKGROUND

Wearable electronics have become widespread in consumer markets due to their convenience and for being lightweight. Functionality of wearable electronics continues to increase as technology becomes smaller and wearable electronics are integrated for use in routine activities. However, wearable electronics are currently designed to mimic the form of other devices that are generally bulky and hard, such as watches or bracelets. Watches have conventionally made straps from rubber, or metal and this has been carried through with smartwatches.

With the creation of conductive fabric and conductive thread, electronics may be intertwined with clothing or other applications of fabric. Conductive fabric used in watch straps can provide additional functionality, which would otherwise be limited by the usable space on a watch face. Worn on other parts of the body, conductive fabric can be used to interact with surrounding electronics. The simple transition from rigid components to cloth allows for pressure sensing, multi-finger touch sensing, and non-contact three dimensional (3D) sensing.

BRIEF SUMMARY

Embodiments of the subject invention provide a conductive textile that can be used to sense the motion of a hand in three dimensions, without the need of contact between the hand and the textile. Conductive threads and other electrodes can be woven into the fabric, sewn in, or attached by other means. The three dimensional (3D) conductive fabric can be flexible and comfortably integrated with clothing or used on a watch strap. The 3D conductive fabric can also be used in conjunction with other touch textiles, such as a multi-touch capacitive sensor and/or a resistive touch sensor.

DETAILED DESCRIPTION

The following disclosure and exemplary embodiments are presented to enable one of ordinary skill in the art to make and use the three-dimensional conductive fabric according to the subject invention. Various modifications to the preferred embodiment will be readily apparent to those skilled in the art and the generic principles herein may be applied to other embodiments. Thus, three-dimensional conductive fabric is not intended to be limited to the embodiments shown but is to be accorded the widest scope consistent with the principles and features described herein.

Figure 1:
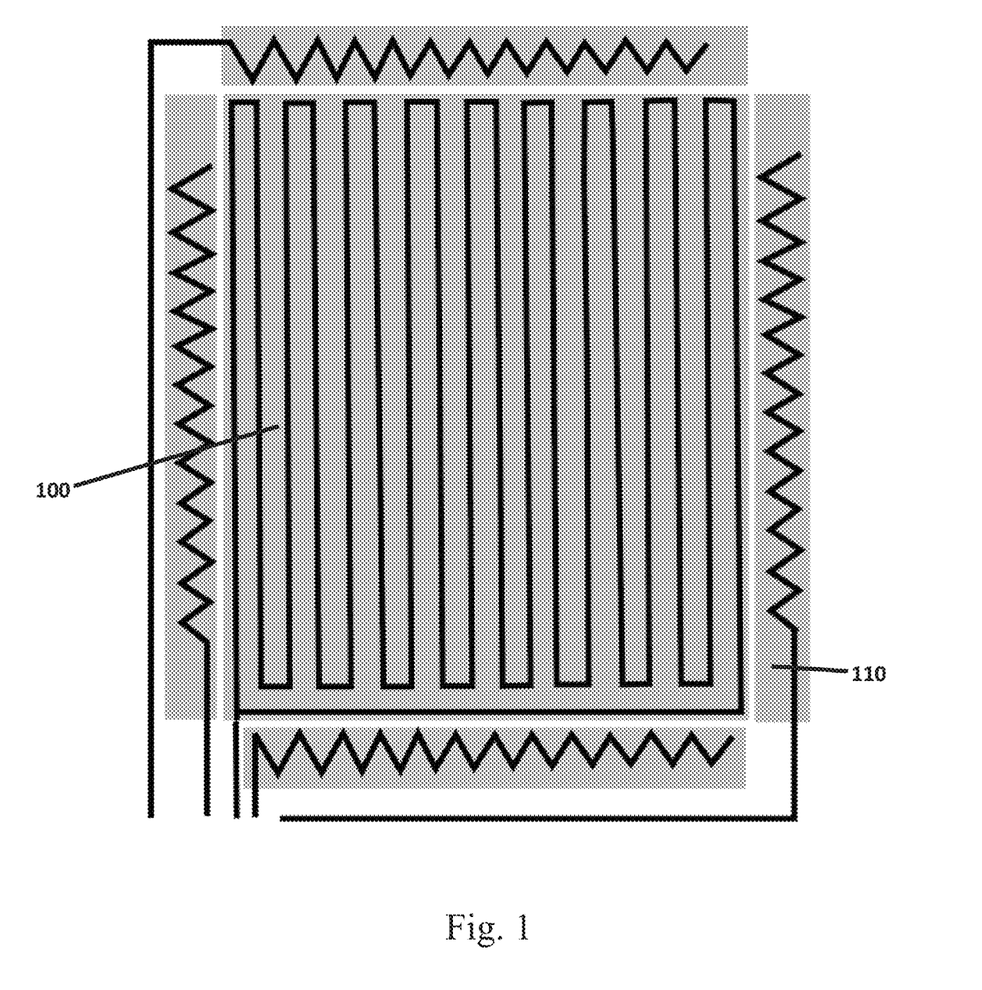
FIG. 1 is diagram of a central transmitter electrode in a snake configuration surrounded by four receiver electrodes, each in a zig zag configuration.

A capacitive textile can be used for the detection of an object passing near the capacitive textile. As seen in FIG. 1 a central transmitter can comprise a conductive thread that is woven, sewn, or otherwise attached to a top surface of a fabric substrate. In some embodiments the flexible substrate comprises an insulating material. In certain embodiments, the central transmitter 100 comprises a conductive thread configured in a snaking pattern. The central transmitter 100 is surrounded by receiving electrodes 110, each being formed from a respective piece of conductive thread and in a zigzag pattern. The central transmitter 100 and the receiving electrodes 110 can be connected to sensors for sensing an electrical current, a magnetic field electrical field, or a capacitance.

The transmitter electrode/central transmitter 100 can vary in size as long as the material does not provide too much electrical resistance. In certain embodiments, the respective length and width dimensions of a rectangular transmitter electrode 100 are each in a range of 1 to 24 inches. Each receiver electrode 110 can have smaller dimensions than the transmitter electrode 100. In certain embodiments, each receiver electrode 110 has a length or width equal to a respective length or width of the transmitter electrode 100, but the other dimension of the receiver electrode 110 can be reduced to ¼ of the respective other dimension of the transmitter electrode 100. The transmitter electrode 100 and the receiver electrodes 110 can each comprise a thread coated in a metal powder (e.g. shaved metal pieces), a thread twisted with a metal wire, a conductive paint (and applied in solid fill or lattice), or a flexible printed circuit board (PCB) with a copper pattern.

The conductive thread can be sewn or woven into regular cloth in any pattern necessary. The conductive thread can be electrically insulated to prevent it from short circuiting when in contact with another wire. An insulating coating can be applied to the conductive thread including cloth, plastic, or resin depending on the location and the use of the particular area. The conductive thread can be flexible to be comfortably integrated with clothing, but strong enough to endure the stress from everyday use and washing.

The conductive fabric does not have to be limited to a single strand wire wrapped in fabric (conductive thread) and can be any conductive material that can be attached to fabric. Small electrodes can be placed between layers of fabric. This may include thin, flexible metal electrodes, metal coated plastic, or a plurality of small electrodes bundled together.

Figure 2:
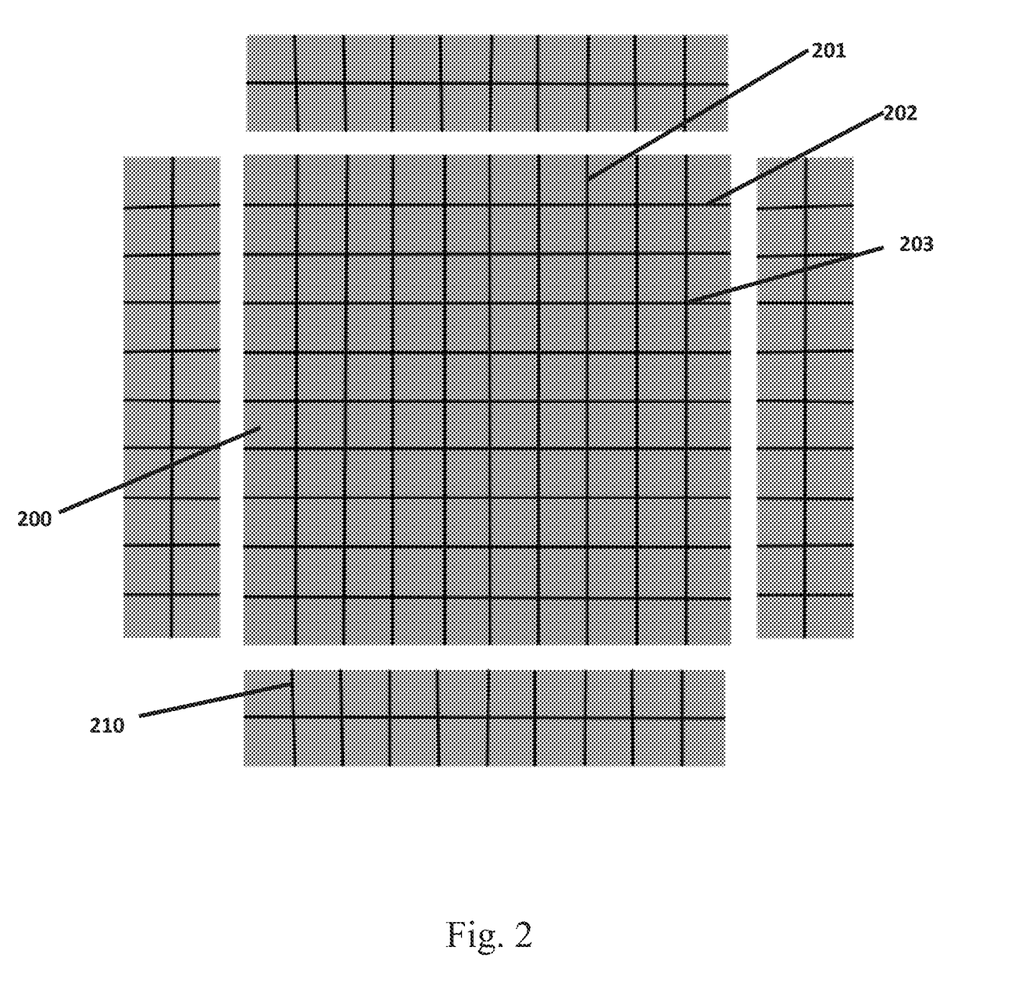
FIG. 2 is a diagram of a central transmitter electrode made of individual electrodes in a grid formation and four receiver electrodes each made of individual electrodes in a grid formation.

In another embodiment, the central transmitting electrode 200 can be in the form of a wire grid, as seen in FIG. 2. The receiving electrodes 210 can also comprise wire electrodes in a grid formation on a top surface of the fabric substrate.

As seen in FIG. 2, the central transmitter 200 can comprise individual electrodes configured in a longitudinal 201 and latitudinal 202 directions. This permits the sensor to bend and conform to the surface of the fabric substrate. The electrode grid forms capacitors at the intersection 203 of the longitudinal 201 and latitudinal 203 electrodes. When a person's finger is near the fabric, the capacitance at the intersection 203 is changed. Each intersection 203 can be measured to determine where the user's finger is on the grid. This method permits multiple objects to be tracked at the same time.

Figure 3A:
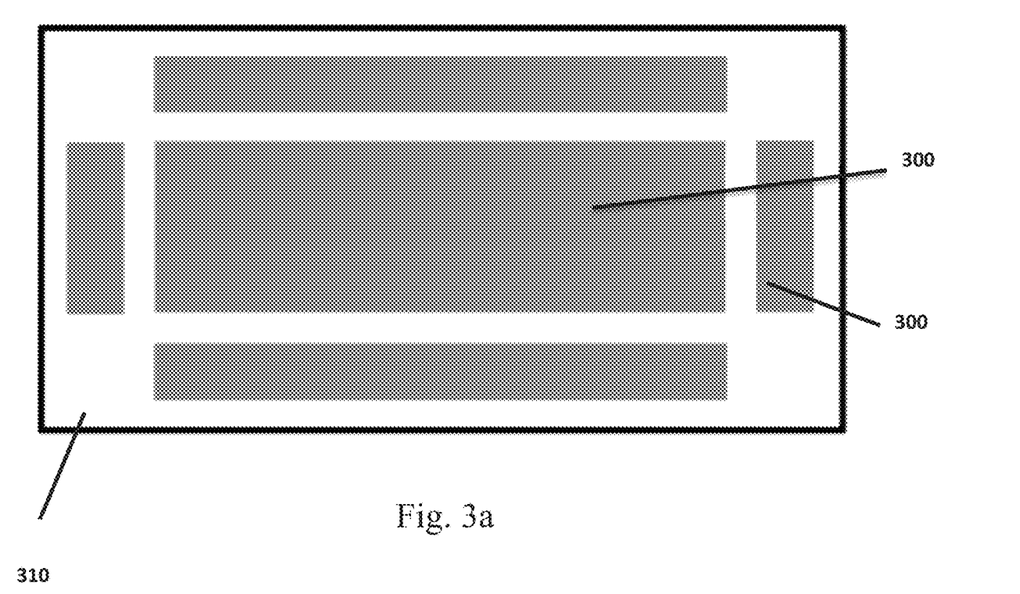
FIG. 3a is a diagram of a flexible dielectric material on a substrate.
Figure 3B:
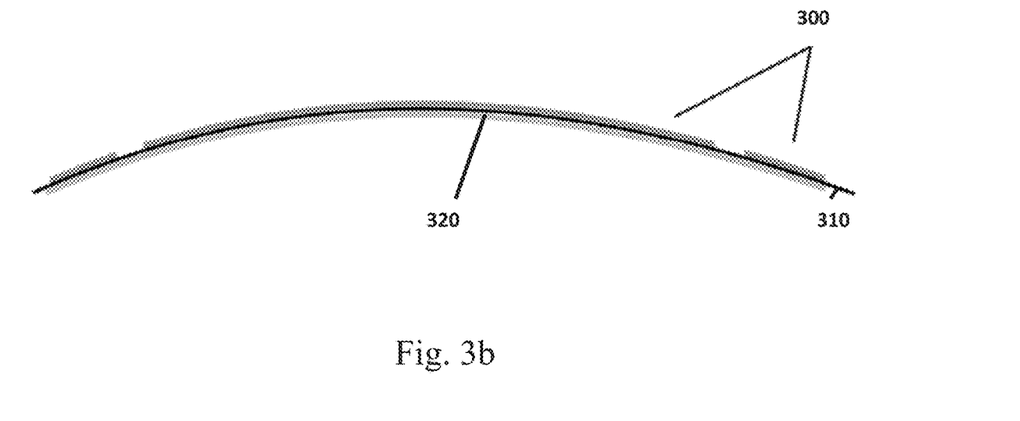
FIG. 3b is a diagram illustrating the flexible nature of the three dimensional conductive fabric.

FIG. 3a shows a plan view of a dielectric material 300 on a fabric substrate 310. FIG. 3b is a diagram illustrating the flexible nature of the three dimensional conductive fabric.

As seen in FIG. 3a, the dielectric material 300 can be in the form of a foil disposed on the fabric substrate 310. The dielectric material 300 can be vacuum-deposited on the fabric substrate 310 or placed by some other appropriate method. As seen in FIG. 3b, a second dielectric material 320 can be attached to the bottom surface of the fabric substrate 310. The second dielectric material 320 can conform to the same pattern of the dielectric 300 on the top surface of the fabric substrate 310 or form a planer bottom layer to cover all or substantial portions of the bottom surface of the fabric substrate 310. The dielectric material and the second dielectric material 300, 320 can be thin enough to be flexible and bend. The dielectric material 300 and the second dielectric material 320 can each comprise commonly used dielectric materials, for example a plastic substrate. In other embodiments, the dielectric material 300, 320 comprises materials used for ribbon connectors or flexible PCBs. The dielectric material 300 and the second dielectric material 320 can each have a respective thickness of approximately 0.05 mm. The central and receiving electrodes can be disposed throughout the insulating fabric in order to determine a position of the object. A dummy portion can separate the central and receiving electrodes. The dummy portion can comprise an insulating fabric or the absence of a conductive fabric.

By sewing or weaving large enough patterns in the textile and by providing enough voltage, a large enough electric field can be created within the area formed by these electrodes. An object passing through the electrical field will distort the electric field and a resulting change in capacitance can be recorded. The applied voltages can be in a range of 1.8 V to 12.0 V (for example 1.8 V, 3.3 V, 5.0 V, 9.0 V, and/or 12.0 V) for battery-powered operations. In one embodiment, a DC-DC converter can be used to increase the voltage if a larger electric field is required for a particular application.

The conductive fabric can be fabricated by applying a conductive ink or conductive sheets (plastic, metal, or other conductive material). Each set of transmitting and receiving electrodes can be in electrical connection. However, respective sets of a central transmitter and receiving electrodes are electrically insulated from each other. The electrode sets can be attached to a single piece of insulating fabric or multiple pieces of insulating fabric.

Figure 4:
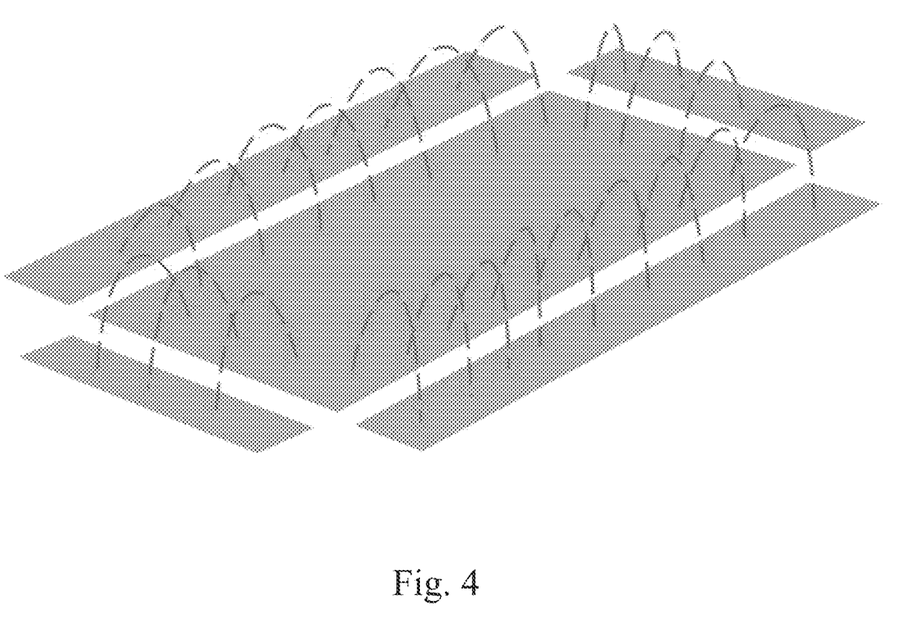
FIG. 4 is a diagram illustrating the electric field lines from the central transmitter electrode to four surrounding receiver electrodes.

An electric field, as seen in FIG. 4, can be produced between the central transmitter 100 and at least one receiving electrode 110. The characteristics of the generated electric field will change as an object passes through the electric field. As a result of the change in electric field a change in capacitance can be detected.

Each of the surrounding receiving electrodes 110 can record a respective change in capacitance due to a conductive object (for example, a hand) coupling with the electrode, by using capacitance measurement techniques or dedicated capacitive sensing hardware. The respective change in capacitance can be used to determine how close the conductive object is to the electrode. With this information, simple gesture recognition for swipe or approach gestures can be used to interact with nearby electronics. An additional piece of fabric with conductive thread can be placed underneath the top layer to serve as a ground plane.

In another embodiment, the three dimensional conductive fabric comprises pressure sensing transducers. The pressure sensing transducer can be disposed throughout the three conductive fabric to permit a processor connected to the pressure sensing transducers to determine a contact position on the three dimensional conductive fabric. In another embodiment, the three dimensional conductive fabric can possess multi-touch functionality, such that it can determine the location of multiple points of contact.

Pressure sensing transducers can operate through a resistive or capacitive approach. The resistive approach uses a grid system made of conductive material on two separate substrates. Conductive threads being sewn in parallel in two different pieces of fabric. The two different pieces of fabric can be attached with their traces being orthogonal to each other and having an insulating material in between. A nonconductive fabric that has small conductive material in it can be compressed, allowing a conductive path to form. The wires at both ends of this material would then be electrically connected and the point of contact can be measured.

For a capacitive approach, a grid of conductive traces can be disposed on the fabric substrate, and capacitors can be formed at a position in which the traces overlap. When a conductive object is near the grid, the capacitance is changed. Each intersection can be measured to determine where the user's finger is on the grid.

In one embodiment, the three dimensional conductive fabric is disposed on a wristband or glove. The wristband of glove can interact with a host device through the three dimensional conductive fabric. In another embodiment, the three dimensional conductive fabric is embodied into clothing and interacts with a wireless device. By applying the three dimensional conductive fabric to clothing including wrist bands or glove, a computing device can be configured to accept hand gestures or body movements as inputs.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A conductive fabric sensor, comprising:
   a first flexible fabric substrate comprising a first surface and a second surface opposite to the first surface;
   a first dielectric layer disposed on, and in direct physical contact with, a central area of the first surface of the first flexible fabric substrate;
   a second dielectric layer, a third dielectric layer, a fourth dielectric layer, and a fifth dielectric layer surrounding the first dielectric layer and disposed on, and in direct physical contact with, the first surface of the first flexible fabric substrate;
   a sixth dielectric layer disposed on, and in direct physical contact with, the second surface of the flexible substrate and having an area at least as great as that of the first dielectric layer;
   a central transmitting electrode on the first dielectric layer;
   a plurality of receiving electrodes surrounding the central transmitting electrode, and being electrically connected to the central transmitting electrode, the plurality of receiving electrodes comprising four receiving electrodes respectively disposed on the second dielectric layer, the third dielectric layer, the fourth dielectric layer, and the fifth dielectric layer;
   a power supply configured to generate a respective electric field between the central transmitting electrode and each receiving electrode of the plurality receiving electrodes; and
   a plurality of resistive pressure sensing transducers comprising conductive threads sewn in parallel in the first flexible fabric substrate and a second flexible fabric substrate, the first flexible fabric substrate and the second flexible fabric substrate being attached with traces thereof being orthogonal to each other and having a compressed insulating material therebetween, and the compressed insulating material comprising a conductive material therewithin having wires at both ends thereof,
   the first dielectric layer having a rectangular shape, when viewed from above the first surface, with a first side, a second side, a third side, and a fourth side,
   the second dielectric layer having a rectangular shape, when viewed from above the first surface, and facing the first side of the first dielectric layer,
   the third dielectric layer having a rectangular shape, when viewed from above the first surface, and facing the second side of the first dielectric layer,
   the fourth dielectric layer having a rectangular shape, when viewed from above the first surface, and facing the third side of the first dielectric layer,
   the fifth dielectric layer having a rectangular shape, when viewed from above the first surface, and facing the fourth side of the first dielectric layer,
   a width of the second dielectric layer being the same as a length of the first side of the first dielectric layer,
   a width of the third dielectric layer being the same as a length of the second side of the first dielectric layer,
   a width of the fourth dielectric layer being the same as a length of the third side of the first dielectric layer,
   a width of the fifth dielectric layer being the same as a length of the fourth side of the first dielectric layer,
   a thickness of the first dielectric layer being about 0.05 millimeters (mm),
   a thickness of the second dielectric layer being about 0.05 mm,
   a thickness of the third dielectric layer being about 0.05 mm,
   a thickness of the fourth dielectric layer being about 0.05 mm,
   a thickness of the fifth dielectric layer being about 0.05 mm, and
   a thickness of the sixth dielectric layer being about 0.05 mm.

2. The conductive fabric sensor of claim 1, the central transmitting electrode comprising a wire electrode configured in a snaking pattern.

3. The conductive fabric sensor of claim 1, each receiving electrode of the plurality of receiving electrodes comprising a wire electrode in a zig zag pattern.

4. The conductive fabric sensor of claim 1, further comprising:
   a sensor configured to sense a respective capacitance between the central transmitter and each receiving electrode of the plurality of receiving electrodes.

5. The conductive fabric sensor of claim 1, the first dielectric layer, the second dielectric layer, the third dielectric layer, the fourth dielectric layer, the fifth dielectric layer, and the sixth dielectric layer all comprising a planar foil.

6. The conductive fabric sensor of claim 1, the conductive fabric sensor being disposed on a wristband or a glove.

7. A computer-based system of motion sensing using a conductive fabric to transmit an input for a computing device, the system comprising:
   the conductive fabric sensor according to claim 1, the conductive fabric sensor being configured to be worn on a body; and
   a non-transitory computer-readable medium comprising instructions that when executed causes at least one processor to translate movements of a body as inputs to the conductive fabric sensor.

8. A conductive fabric sensor, comprising:
   a first flexible fabric substrate comprising a first surface and a second surface opposite to the first surface;
   a first dielectric layer disposed on, and in direct physical contact with, a central area of the first surface of the first flexible fabric substrate;
   a second dielectric layer, a third dielectric layer, a fourth dielectric layer, and a fifth dielectric layer surrounding the first dielectric layer and disposed on, and in direct physical contact with, the first surface of the first flexible fabric substrate;
   a sixth dielectric layer disposed on, and in direct physical contact with, the second surface of the flexible substrate and having an area at least as great as that of the first dielectric layer;
   a central transmitting electrode on the first dielectric layer and configured in a grid pattern;
   a plurality of receiving electrodes surrounding the central transmitting electrode, each receiving electrode of the plurality of receiving electrodes comprising a wire electrode configured in a grid pattern, and the plurality of receiving electrodes comprising four receiving electrodes respectively disposed on the second dielectric layer, the third dielectric layer, the fourth dielectric layer, and the fifth dielectric layer;

a power supply configured to generate a respective electric field between the central transmitting electrode and each receiving electrode of the plurality receiving electrodes; and a plurality of resistive pressure sensing transducers comprising conductive threads sewn in parallel in the first flexible fabric substrate and a second flexible fabric substrate, the first flexible fabric substrate and the second flexible fabric substrate being attached with traces thereof being orthogonal to each other and having a compressed insulating material therebetween, and the compressed insulating material comprising a conductive material therewithin having wires at both ends thereof, the first dielectric layer having a rectangular shape, when viewed from above the first surface, with a first side, a second side, a third side, and a fourth side, the second dielectric layer having a rectangular shape, when viewed from above the first surface, and facing the first side of the first dielectric layer, the third dielectric layer having a rectangular shape, when viewed from above the first surface, and facing the second side of the first dielectric layer, the fourth dielectric layer having a rectangular shape, when viewed from above the first surface, and facing the third side of the first dielectric layer, the fifth dielectric layer having a rectangular shape, when viewed from above the first surface, and facing the fourth side of the first dielectric layer, a width of the second dielectric layer being the same as a length of the first side of the first dielectric layer, a width of the third dielectric layer being the same as a length of the second side of the first dielectric layer, a width of the fourth dielectric layer being the same as a length of the third side of the first dielectric layer, a width of the fifth dielectric layer being the same as a length of the fourth side of the first dielectric layer, a thickness of the first dielectric layer being about 0.05 millimeters (mm), a thickness of the second dielectric layer being about 0.05 mm, a thickness of the third dielectric layer being about 0.05 mm, a thickness of the fourth dielectric layer being about 0.05 mm, a thickness of the fifth dielectric layer being about 0.05 mm, and a thickness of the sixth dielectric layer being about 0.05 mm.

9. The conductive fabric sensor of claim 8, further comprising:

a sensor configured to sense a respective capacitance between the central transmitter and each receiving electrode of the plurality of receiving electrodes.

10. The conductive fabric sensor of claim 8, the central transmitting electrode and the plurality of receiving electrodes being woven or sewn onto the flexible fabric substrate.

11. A conductive fabric sensor, comprising:

a first flexible fabric substrate comprising a first surface and a second surface opposite to the first surface;

a first dielectric layer disposed on, and in direct physical contact with, a central area of the first surface of the first flexible fabric substrate;

a second dielectric layer, a third dielectric layer, a fourth dielectric layer, and a fifth dielectric layer surrounding the first dielectric layer and disposed on, and in direct physical contact with, the first surface of the first flexible fabric substrate;

a sixth dielectric layer disposed on, and in direct physical contact with, the second surface of the flexible substrate and having an area at least as great as that of the first dielectric layer;

a central transmitting electrode on the first dielectric layer and configured in a grid pattern;

a plurality of receiving electrodes surrounding the central transmitting electrode, each receiving electrode of the plurality of receiving electrodes comprising a wire electrode configured in a grid pattern, and the plurality of receiving electrodes comprising four receiving electrodes respectively disposed on the second dielectric layer, the third dielectric layer, the fourth dielectric layer, and the fifth dielectric layer;

a power supply configured to generate a respective electric field between the central transmitting electrode and each receiving electrode of the plurality receiving electrodes;

a sensor configured to sense a respective capacitance between the central transmitter and each receiving electrode of the plurality of receiving electrodes; and a plurality of resistive pressure sensing transducers comprising conductive threads sewn in parallel in the first flexible fabric substrate and a second flexible fabric substrate, the first flexible fabric substrate and the second flexible fabric substrate being attached with traces thereof being orthogonal to each other and having a compressed insulating material therebetween, and the compressed insulating material comprising a conductive material therewithin having wires at both ends thereof, the central transmitting electrode and the plurality of receiving electrodes being woven or sewn onto the first flexible fabric substrate, the conductive fabric sensor being disposed on a wristband or a glove, the first dielectric layer having a rectangular shape, when viewed from above the first surface, with a first side, a second side, a third side, and a fourth side, the second dielectric layer having a rectangular shape, when viewed from above the first surface, and facing the first side of the first dielectric layer, the third dielectric layer having a rectangular shape, when viewed from above the first surface, and facing the second side of the first dielectric layer, the fourth dielectric layer having a rectangular shape, when viewed from above the first surface, and facing the third side of the first dielectric layer, the fifth dielectric layer having a rectangular shape, when viewed from above the first surface, and facing the fourth side of the first dielectric layer, a width of the second dielectric layer being the same as a length of the first side of the first dielectric layer, a width of the third dielectric layer being the same as a length of the second side of the first dielectric layer, a width of the fourth dielectric layer being the same as a length of the third side of the first dielectric layer, a width of the fifth dielectric layer being the same as a length of the fourth side of the first dielectric layer, a thickness of the first dielectric layer being about 0.05 millimeters (mm),
a thickness of the second dielectric layer being about 0.05 mm,
a thickness of the third dielectric layer being about 0.05 mm,
a thickness of the fourth dielectric layer being about 0.05 mm,
a thickness of the fifth dielectric layer being about 0.05 mm, and
a thickness of the sixth dielectric layer being about 0.05 mm.

12. The conductive fabric sensor of claim 1, the sixth dielectric layer covering the entire second surface of the first flexible fabric substrate.

13. The conductive fabric sensor of claim 8, the sixth dielectric layer covering the entire second surface of the first flexible fabric substrate.

14. The conductive fabric sensor of claim 11, the sixth dielectric layer covering the entire second surface of the first flexible fabric substrate.

\* \* \* \* \*